(12) United States Patent
Kisigami et al.

(10) Patent No.: US 7,117,016 B2
(45) Date of Patent: Oct. 3, 2006

(54) ADAPTIVE ANTENNA BASE STATION APPARATUS

(75) Inventors: Takaaki Kisigami, Kawasaki (JP); Takashi Fukagawa, Kawasaki (JP); Yasuaki Yuda, Kawasaki (JP); Masayuki Hoshino, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 730 days.

(21) Appl. No.: 10/383,552

(22) Filed: Mar. 10, 2003

(65) Prior Publication Data

US 2004/0204113 A1 Oct. 14, 2004

(30) Foreign Application Priority Data

Mar. 12, 2002 (JP) ............................. 2002-066467

(51) Int. Cl.
- *H04M 1/00* (2006.01)
- *G01S 5/02* (2006.01)
- *H03K 9/00* (2006.01)

(52) U.S. Cl. ..................... 455/562.1; 342/417; 375/316

(58) Field of Classification Search ............. 455/550.1, 455/561, 562.1, 575.7; 375/316, 346; 342/417, 342/445

See application file for complete search history.

(56) References Cited

U.S. PATENT DOCUMENTS

| | | | | |
|---|---|---|---|---|
| 4,771,289 A | * | 9/1988 | Masak | 342/383 |
| 4,920,348 A | * | 4/1990 | Baghdady | 342/433 |
| 5,299,148 A | * | 3/1994 | Gardner et al. | 702/196 |
| 5,739,788 A | * | 4/1998 | Dybdal et al. | 342/359 |
| 5,761,237 A | * | 6/1998 | Petersen et al. | 375/148 |
| 5,943,013 A | * | 8/1999 | Ohashi | 342/417 |
| 6,310,704 B1 | | 10/2001 | Dogan et al. | |
| 6,349,218 B1 | * | 2/2002 | Nakagawa et al. | 455/562.1 |
| 6,351,238 B1 | * | 2/2002 | Kishigami et al. | 342/445 |
| 6,421,000 B1 | * | 7/2002 | McDowell | 342/357.06 |
| 6,470,043 B1 | * | 10/2002 | Lo et al. | 375/144 |
| 6,501,943 B1 | * | 12/2002 | Ide et al. | 455/101 |
| 6,529,745 B1 | * | 3/2003 | Fukagawa et al. | 455/562.1 |

FOREIGN PATENT DOCUMENTS

| | | |
|---|---|---|
| EP | 1 028 544 A1 | 8/2000 |
| EP | 1 161 001 A2 | 12/2001 |
| GB | 2 318 705 | 4/1998 |

\* cited by examiner

*Primary Examiner*—Bing Q. Bui
(74) *Attorney, Agent, or Firm*—Louis Woo

(57) ABSTRACT

An adaptive antenna base station apparatus comprises an array antenna including N (N being a natural number) antenna elements; N reception sections for respectively performing orthogonal detection of high-frequency signals, respectively received by the antenna elements, after frequency conversion; N×M despreading sections for performing despreading operations, corresponding to delay times of M (M being a natural number) path components included in output signals of the reception sections; M correlation computing sections for performing correlations among the antenna elements for each path; a correlation combining section for combining output signals of the correlation computing sections; and a DOA estimating section for estimating a direction of arrival (DOA) by using an output of the correlation combining section. This can ensure collective estimation of DOAs of M path components, thereby reducing the amount of computation of estimating the DOAs for plural paths and the cost for the apparatus.

17 Claims, 8 Drawing Sheets

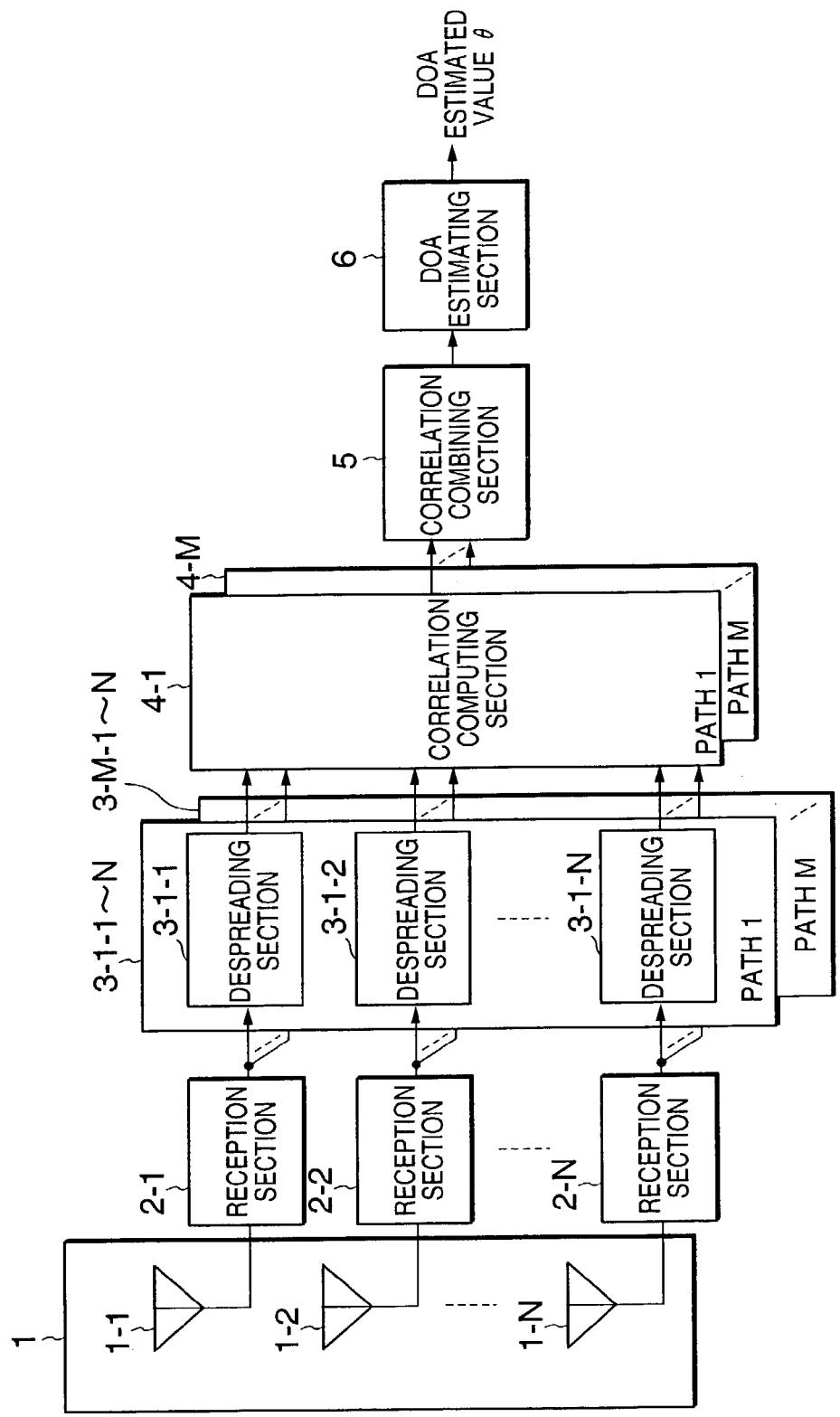

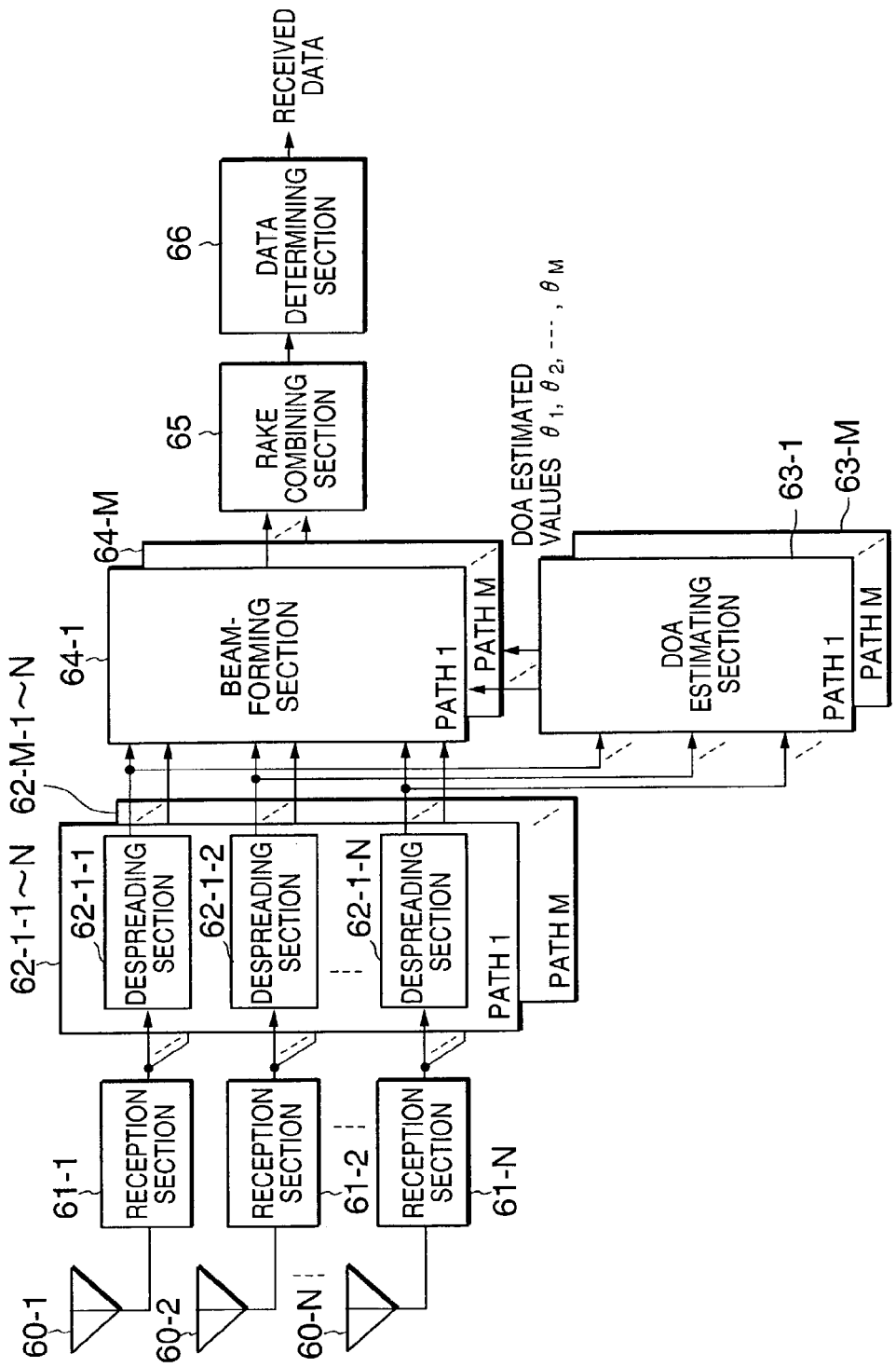

ADAPTIVE ANTENNA BASE STATION APPARATUS

TECHNICAL FIELD

The present invention relates to a base station apparatus of a CDMA (Code Division Multiple Access) mobile communication type which is equipped with an adaptive antenna which varies the directivity of its array antenna based on the result of directional estimation using the array antenna.

BACKGROUND OF THE INVENTION

As a signal which is received by a base station apparatus is interfered by various signals, its reception quality is deteriorated. An array antenna is known as the technology that suppresses this interference and intensely receives electric waves to be received which come only from the direction of arrival. The array antenna can intensely receive electric waves to be received which come only from the direction of arrival by adjusting the amplitudes and phases which are to be given to reception signals by adjusting the weight coefficient (hereinafter called "weight") by which the reception signals are to be multiplied.

Further, there is Rake reception that is a technique to enhance the reception quality. Rake reception can provide a path diversity gain by combining signals coming through different paths on the time axis even under a multipath environment. In general, even a base station apparatus equipped with an array antenna often performs this Rake reception.

In this case, the base station apparatus estimates the direction of arrival of a signal coming through each path and receives the signal with the directivity that is set in the estimated direction by the array antenna. The following will describe a conventional adaptive antenna base station apparatus which carries out both array reception and Rake reception.

FIG. 8 is a block diagram showing the structure of the conventional base station apparatus. In case where there are M paths, the base station apparatus comprises N antennae 60-1 to 60-N, N reception sections 61-1-1 to 61-N, N×M despreading sections 62-1-1 to 62-1-N, ..., and 62-M-1 to 62-M-N, M beamforming sections 64-1 to 64-M, M direction-of-arrival (DOA) estimating sections 63-1 to 63-M, a Rake combining section 65 and a data determining section 66, where N and M are integers. Those components will be elaborated below.

In the conventional base station apparatus, signals which are to be received by the N antennae 60-1 to 60-N are subjected to radio processing (downconversion, A/D conversion, etc.) by the N reception sections 61-1-1 to 61-N which are provided in association with the antennae 60-1 to 60-N, and are then input to the N×M despreading sections 62-1-1 to 62-1-N, ..., and 62-M-1 to 62-M-N.

The despreading sections 62-1-1 to 62-1-N, ..., and 62-M-1 to 62-M-N perform a despreading process on signals which respectively come through the first path to the M-th path. That is, the despreading sections 62-p-1 to 62-p-N perform N despreading processes on the output signals of the N reception sections 61-1-1 to 61-N according to the reception timing for the signals that come through the p-th path (p being an integer from "1" to "M"). Accordingly, the despreading sections 62-p-1 to 62-p-N acquire signals on the p-th path (hereinafter called "path-p signals") which have been received by the N antennae 60-1 to 60-N. N signals on the path p, which are the outputs of the despreading sections 62-p-1 to 62-p-N are input to the DOA estimating section 63-p and the beamforming section 64-p.

The DOA estimating sections 63-1 to 63-M respectively estimate the directions of arrival $\theta_1$ to $\theta_M$ of the path-1 to path-M signals. The estimated directions of arrival $\theta_1$ to $\theta_M$ are respectively input to the M beamforming sections 64-1 to 64-M.

The beamforming section 64-p combines N path-p signals or the output signals of the despreading sections by multiplying those signals by a reception weight, generated by using a direction of arrival (DOA) $\theta p$. Accordingly, the beamforming section 64-p outputs a single array-combined path-p signal and the beamforming sections 64-1 to 64-M output M array-combined signals which are to be input to the Rake combining section 65.

The Rake combining section 65 multiplies the input M array-combined path-p signals respectively by complex conjugates $(S_1)^*$ to $(S_M)^*$ of channel estimated values $S_1$ to $S_M$ to compensate for channel variations $h_1$, to $h_M$, and then Rake-combines the signals. The Rake-combined signal is demodulated in the data determining section 66, thus yielding received data.

A description will now be given of a beamforming scheme as an operation of estimating the direction of arrival which is carried out in the conventional base station apparatus. The DOA estimating section 63-p forms a p-th path signal vector x(k), given by an equation 1 below, from a signal $X_n(k)$ from the antenna 60-n at a sample time $k\Delta T$ (where k is a natural number and $\Delta T$ is a sampling interval) of the p-th path signal, and computes a correlation matrix R, expressed by an equation 2, by using the p-th path signal vectors x(k) accumulated over a predetermined Ns sample period, where n=1 to N, T indicates transpose and H indicates complex conjugate transpose.

$$x(k) = [x_1(k) x_2(k) \ldots x_N(k)]^T \tag{1}$$

$$R = \frac{1}{N_s} \sum_{k=1}^{N_s} x(k) x(k)^H \tag{2}$$

The angular spectrum is computed by changing $\theta$ of a DOA evaluation function $F(\theta)$, given by an equation 3, using the correlation matrix R obtained from the equation 2, and then the position of a maximum peak is detected as a direction-of-arrival (DOA) estimated value $\theta p$. It is to be noted however that $a(\theta)$ is a steering vector which is determined by the layout of the array antenna elements and can be expressed as an equation 4 in case of an equidistance linear array with an element interval d. In the equation 4, $\lambda$ is the wavelength of a carrier and $\theta$ is an angle with the normal direction of the array set to be the direction of 0°.

$$F(\theta) = a^H(\theta) R a(\theta) \tag{3}$$

$$a(\theta) = \begin{bmatrix} 1 \\ \exp\{-j2\pi d \cdot 1 \cdot \sin\theta/\lambda\} \\ \vdots \\ \exp\{-j2\pi d \cdot (N-1) \cdot \sin\theta/\lambda\} \end{bmatrix} \tag{4}$$

However, the conventional adaptive antenna base station apparatus with the above-described structure acquires the angular spectrum path by path and requires, for the respective paths, the DOA estimating sections which perform the same operation., This disadvantageously increases the scale of the apparatus. In case of Rake-combining M path signals, the apparatus should have M DOA estimating sections that perform the same operation. In case of acquiring the angular spectrum, the operations shown in the equations 3 and 4 should be performed. This raises another problem that the amount of computation which should be done by the conventional adaptive antenna base station apparatus increases exponentially in accordance with an increase in the number of the antenna elements and an increase in the number of the paths to be subjected to Rake combining. Further, as the structure is prepared for each communication terminal, if the number of communication terminals (i.e., the number of channels) with which the base station apparatus can communicate simultaneously increases, the scale of the apparatus and the amount of computation are further increased. With the recent significant leap in the quantity of communication terminal data, the scale of the apparatus and the amount of computation tend to increase further.

SUMMARY OF THE INVENTION

Accordingly, it is an object of the invention to provide an adaptive antenna base station apparatus equipped with an array antenna, which acquires a path diversity gain, contributes to downsizing the apparatus by reducing the amount of computation at the time of estimating the direction of arrival and has a desired Signal-To-Interference-Ratio (SIR) improved by forming a null with an array antenna directivity in the direction of interference.

To achieve the object, an adaptive antenna base station apparatus according to the invention has a general structure which comprises an array antenna including N (N being an integer) antenna elements; N reception sections for respectively performing orthogonal detection of high-frequency signals, respectively received by the antenna elements of the array antenna, after frequency conversion of the high-frequency signals; N×M despreading sections for performing despreading operations, corresponding to delay times of M (M being an integer) path components included in output signals of the reception sections, with respect to the output signals of the reception sections; M correlation computing sections for performing correlations among the antenna elements on output signals of the despreading sections for each path; a correlation combining section for combining output signals of the correlation computing sections; and a direction-of-arrival estimating section for estimating a direction of arrival by using an output of the correlation combining section.

An adaptive antenna base station apparatus according to the first aspect of the invention comprises an array antenna including N (N being a natural number) antenna elements; N reception sections for respectively performing orthogonal detection of code-multiplexed high-frequency signals, respectively received by the antenna elements of the array antenna, after frequency conversion of the code-multiplexed high-frequency signals; N×M despreading sections for performing despreading operations, corresponding to delay times of M (M being a natural number) path components included in output signals of the reception sections, with respect to the output signals of the reception sections; M correlation computing sections for performing correlations among the antenna elements on output signals of the despreading sections for each path; a correlation combining section for combining output signals of the correlation computing sections; and a direction-of-arrival estimating section for estimating a direction of arrival by using an output of the correlation combining section. The adaptive antenna base station apparatus has an effect of estimating path directions with an upper limit of M, at a time, in a single direction-of-arrival estimating process.

According to the first mode of the adaptive antenna base station apparatus, the correlation computing sections may compute correlation vectors corresponding to individual paths by performing a complex correlation operation on a signal vector, obtained from a single antenna element for each path, as a reference, and signal vectors obtained from the other antenna elements. This structure has an effect of reducing the amount of computation as compared with the case where a correlation matrix is computed and reducing the scale of the apparatus accordingly.

According to the second mode of the adaptive antenna base station apparatus, the correlation computing sections may compute correlation matrices corresponding to individual paths by performing a complex correlation operation on all combinations of signal vectors obtained from the antenna elements path by path. This structure brings about an effect of estimating the direction of arrival at a higher precision than the one that uses correlation vectors under a propagation environment where the spread angle of incoming path components is large, with a little price of an increased amount of computation.

In any of the apparatus of the first aspect of the invention and the apparatuses of the first and second modes of the first aspect of the invention, the direction-of-arrival estimating section may compute an angular spectrum based on the output of the correlation combining section, detect a position of a highest peak of the angular spectrum and set the detected position as an estimated value of the direction of arrival. This structure has an effect of estimating the steering beam direction that maximizes the combined power of M paths and suppressing the influence of the interference.

In any of the apparatuses of the first aspect of the invention and the first and second modes of the first aspect of the invention, the direction-of-arrival estimating section may compute an angular spectrum based on the output of the correlation combining section, detect positions of peaks of the angular spectrum and set the detected positions as estimated values of the direction of arrival whose quantity has an upper limit of M. As the structure estimates the direction of arrival of a maximum of M path components from a single angular spectrum, it brings about an effect of reducing the amount of computation and reducing the scale of the apparatus accordingly.

In any of the apparatuses of the first aspect of the invention and the first to fourth modes of the first aspect of the invention, the adaptive antenna base station apparatus may further comprise M beamforming sections for generating beamweights which determine a directivity of the array antenna by using an output of the direction-of-arrival estimating section, multiplying the beamweights by outputs of the despreading sections and combining multiplication results path by path; a Rake combining section for combining outputs of the beamforming sections obtained path by path; and a data determining section for outputting received data from an output of the Rake combining section in accordance with code determination. This structure has an effect of suppressing the influence of the interference by receiving electric waves by directing the directivity of the array antenna common to M paths in the direction that maximizes the combined power of M path components coming from the nearby directions.

In any of the apparatuses of the first aspect and the first to fourth modes of the first aspect of the invention, the adaptive antenna base station apparatus may further comprise a transmission beamforming section for generating a transmission beamweight which determines a directivity of the array antenna by using an output of the direction-of-arrival estimating section and multiplying a transmission signal by the transmission beamweight; N spreading sections for multiplying an output signal of the transmission beamforming section by spread codes corresponding to the antenna elements; and N transmission sections for transmitting output signals of the spreading sections from the array antenna. This structure has an effect of suppressing interference to other path components by transmitting electric waves by directing the directivity of the array antenna common to M paths in the direction that maximizes the combined power of M path components coming from the nearby directions, and reducing the amount of computation and the apparatus scale by transmitting electric waves by directing the directivity of the array antenna to the direction of arrival of a maximum of M path components estimated from a single angular spectrum, with respect to the M path components whose directions differ from one another in a wide range.

An adaptive antenna base station apparatus according to the second aspect of the invention comprises an array antenna including N (N being a natural number) antenna elements; $N_u \times N$ reception sections for respectively performing orthogonal detection of code-multiplexed high-frequency signals, respectively received by the antenna elements of the array antenna, after frequency conversion of the code-multiplexed high-frequency signals in association with $N_u$ ($N_u$ being a natural number) pieces of user-by-user information included in a received wave; $N_u \times N \times M$ despreading sections for performing despreading operations, corresponding to delay times of M (M being a natural number) path components included in output signals of the reception sections, with respect to the output signals of the reception, sections; $N_u \times M$ correlation computing sections for performing correlations among the antenna elements on output signals of the despreading sections for each path; $N_u$ correlation combining sections for combining output signals of the correlation computing sections; an interuser correlation combining section for combining $N_u$ output signals of the correlation combining sections; $U_u$ other-user correlation subtracting sections for computing correlation components of ($N_u-1$) other users by subtracting an output of that correlation combining section which is associated with a target user from an output of the interuser correlation combining section; and $N_u$ direction-of-arrival estimating sections for estimating a direction of arrival of the target user by using outputs of the other-user correlation subtracting sections. This structure has effects of suppressing correlation components originating from incoming electric waves from another user and accurately detecting the direction of arrival of electric waves from a predetermined user.

According to the first mode of the second aspect of the invention, the adaptive antenna base station apparatus may further comprise $N_u \times M$ beamforming sections for generating beamweights that minimize reception power of other user components, which become interference waves for every $N_u$ users, from output signals of the $N_u$ direction-of-arrival estimating sections and output signals of the $N_u$ other-user correlation subtracting sections, multiplying the beamweights by output signals of M×N spreading sections and combining M paths for every $N_u$ users; $N_u$ Rake combining sections for combining outputs of the beamforming sections; and $N_u$ data determining sections for outputting received data from outputs of the Rake combining sections in accordance with code determination. This structure brings about an effect of adaptively suppressing the interference.

In the apparatus of the second aspect of the invention or the apparatus of the first mode of the second aspect of the invention, the adaptive antenna base station apparatus may further comprise an all user directions combining section for combining steering vectors of the array antenna from output signals of the $N_u$ direction-of-arrival estimating sections; $N_u$ transmission beamforming sections for generating transmission beamweights which minimize transmission power to other users from an estimated value of the direction of arrival and an output signal of the all user directions combining section for every $N_u$ users and multiplying a transmission signal by the transmission beamweights; $N_u \times N$ spreading sections for multiplying output signals of the transmission beamforming sections by spread codes corresponding to the $N_u$ users and N antenna elements; and $N_u \times N$ transmission sections for transmitting output signals of the spreading sections from the array antenna. This structure has an effect of improving the SIR by electric waves by directing the directivity of the array antenna common to M paths in the direction that maximizes the combined power of M path components coming from the nearby directions and forming a null with the directivity of the array antenna with respect to other users who are communicating at the same time.

In the apparatus of the second mode of the second aspect of the invention, the all user directions combining section may combine the steering vectors in a direction of estimation of the array antenna by a weight coefficient which depends on the transmission power. This structure has an effect of forming the optimal transmission beam by forming a null which depends on the transmission power of each user.

In any of the apparatuses of the second aspect of the invention and the first to third modes of the second aspect of the invention, the interuser correlation combining section may combine outputs of the correlation combining sections of a user which are signals of a fast data rate. This structure has effects of suppressing correlation components originating from high-transmission-power electric signal waves incoming at a fast data rate and accurately detecting the direction of arrival of electric waves from a predetermined user.

BRIEF DESCRIPTION OF THE DRAWINGS

FIG. 1 is a block diagram showing the structure of an adaptive antenna base station apparatus according to a first embodiment of the invention;

FIG. 8 is a block diagram illustrating the structure of a conventional adaptive antenna base station apparatus.

DETAILED DESCRIPTION OF THE INVENTION

Figure 2A:
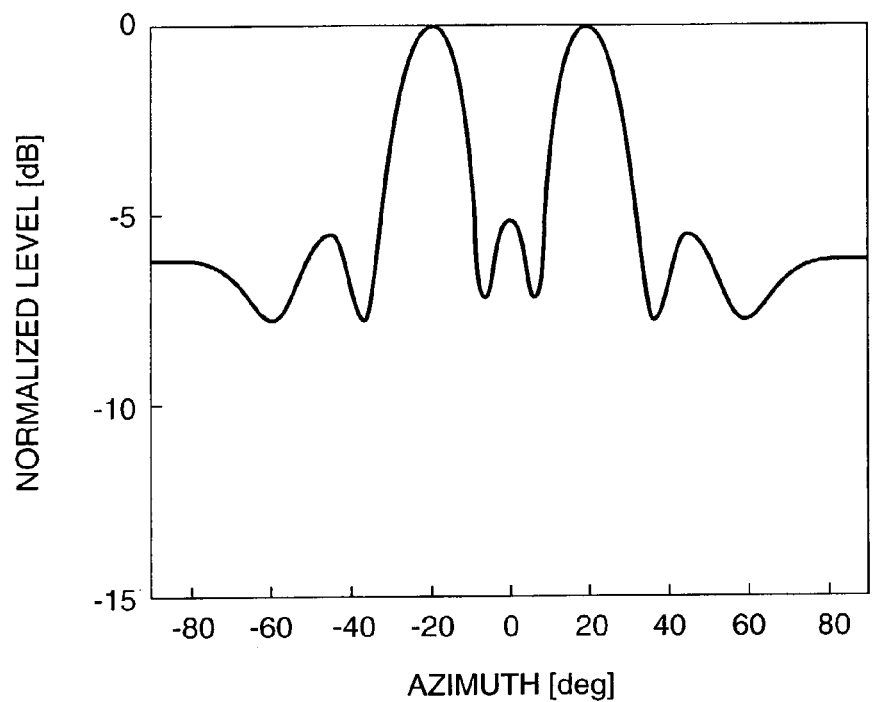
FIGS. 2A and 2B are diagrams showing results of estimation performed by a DOA estimating section according to the first embodiment.

Preferred embodiments of the invention will now be described with reference to FIGS. 1 through 7.

(First Embodiment)

FIG. 1 is a block diagram showing the structure of an adaptive antenna base station apparatus according to the first embodiment of the invention, which comprises an array antenna 1, reception sections 2-1 to 2-N, despreading sections 3-1-1 to 3-1-N, . . . , and 3-M-1 to 3-M-N, correlation computing sections 4-1 to 4-M, a correlation combining section 5 and a DOA (Direction-Of-Arrival) estimating section 6. Those components will be discussed in detail.

The array antenna 1 receives code-multiplexed high-frequency signals at the N antenna elements 1-1 to 1-N, inputs the signals to the reception sections 2-1 to 2-N respectively provided in the antenna elements 1-1 to 1-N, performs high-frequency amplification, frequency conversion, orthogonal detection and A/D conversion in order and inputs the resultant signals to the despreading sections 3-1-1 to 3-1-N, . . . , and 3-M-1 to 3-M-N.

The despreading sections 3-1-1 to 3-1-N, . . . , and 3-M-1 to 3-M-N perform a despreading process on M multipath components (hereinafter called "first path to M-th path") incident to the N antenna elements 1-1 to 1-N. That is, the despreading section 3-1-1 performs a despreading process at the reception timing of the first path incident to the antenna element 1-1, and the despreading section 3-1-p (p being a natural number not greater than M) performs a despreading process at the reception timing of the p-th path incident to the antenna element 1-1. This requires M×N despreading sections.

Each of the correlation computing sections 4-1 to 4-M forms a p-th path signal vector $x^P(k)$ given by an equation 5 from signals $x^P_n$ on the antenna element 1-n at a sample time $k\Delta T$ of the p-path signal (where k is a natural number and $\Delta T$ is a sampling interval), and then acquires a correlation vector $r^P$ given by an equation 6 using the p-th path signal vector $x^P(k)$ accumulated over every predetermined Ns sample period, where n=1 to N and T indicates transpose.

$$x^P(k) = [x_1^P(k) x_2^P(k) \ldots x_N^P(k)]^T \quad (5)$$

$$r^P = \frac{1}{N_s} \sum_{k=1}^{N_s} (x_n^P(k))^* x^P(k) \quad (6)$$

The correlation combining section 5 combines the correlation vectors acquired in the correlation computing sections 4-1 to 4-M as indicated by an equation 7.

$$r = \sum_{P=1}^{M} r^P \quad (7)$$

The DOA estimating section 6 computes the angular spectrum by changing θ of a DOA evaluation function F(θ), given by an equation 8, and then detects the positions of Nd peaks (Nd being a natural number) in the descending order of the reception power level as DOA estimated values. It is to be noted however that a(θ) is the steering vector which is determined by the layout of the array antenna elements and can be expressed as an equation 9 in case of an equidistance linear array with an element interval d. In the equations 8 and 9, λ is the wavelength of a carrier, θ is an angle with the normal direction of the array set to be the direction of 0° and H represents a complex conjugate transpose.

$$F(\theta) = |r^H a(\theta)| \quad (8)$$

$$a(\theta) = \begin{bmatrix} 1 \\ \exp\{-j2\pi d \cdot 1 \cdot \sin\theta/\lambda\} \\ \vdots \\ \exp\{-j2\pi d \cdot (M-1) \cdot \sin\theta/\lambda\} \end{bmatrix} \quad (9)$$

Figure 2B:
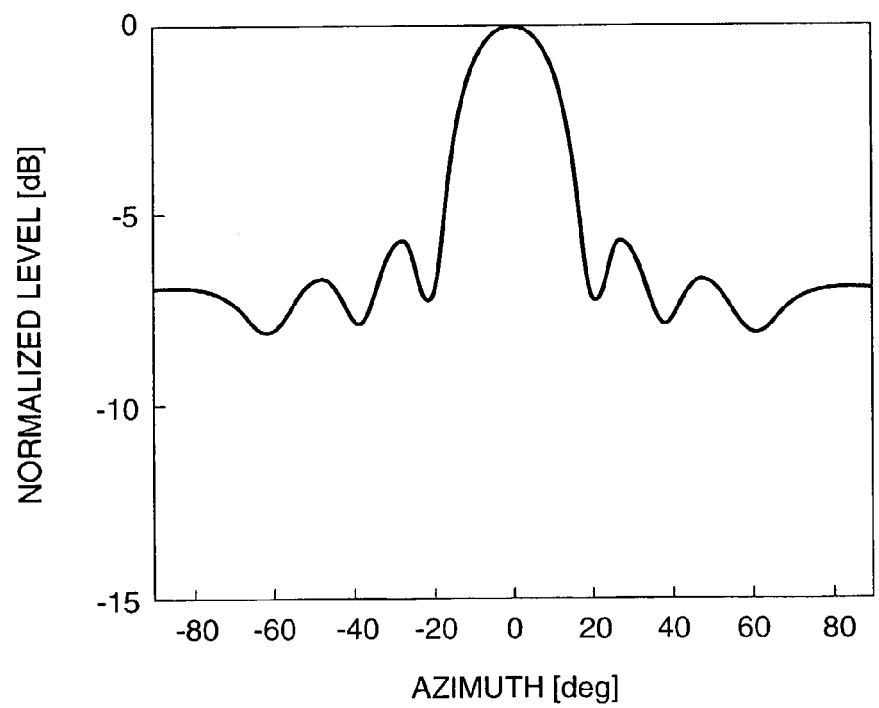

FIGS. 2A and 2B show the results of computing the angular spectrum in case where the quantity N of the antenna elements 1-1 to 1-N is equal to 8 and the number of paths, M, is equal to 2 (paths are assumed to be two of the equal level). The horizontal scale indicates the azimuth [deg], and the vertical scale indicates the level [dB] of reception power normalized. FIG. 2A shows the results when the angle of arrival (AOA) of the path 1 is $\theta_1=20°$ and the AOA of the path 2 is $\theta_2=-20°$, and FIG. 2B shows the results when the AOA of the path 1 is $\theta_1=5°$ and the AOA of the path 2 is $\theta_2=-5°$. The estimation of the DOA shown by the equation 8 belongs to the beamforming scheme, and can detect a peak in the angular spectrum with respect to the path direction with a maximum M paths in case where the AOA of the M paths is sufficiently apart from the steering beamwidth which is formed by an array weight $W=a^H(\theta)$ formed by the array antenna 1 (FIG. 2A). In case where the AOA of the M paths is close (FIG. 2B), peaks in the angular spectrum overlap and the steering beam direction that maximizes the combined power of the M paths becomes the DOA.

According to the embodiment, as described above, the DOA estimating section 6 computes the angular spectrum by using the correlation vector that is shown in the equation 7 and acquired by combining the correlation vectors for the individual paths, and the steering beam direction becomes the direction that maximizes the combined power of the M paths when Nd is 1 and M path directions are estimated at a time through a single DOA estimating process when Nd is equal to or greater than 1. Because DOAs of M paths are estimated from a single angular spectrum, this case would bring about an effect of reducing the amount of computation the scale of the apparatus, Although the estimation of the DOA is carried out using the correlation vectors in the embodiment, the DOA may be estimated using a correlation matrix by computing the correlation matrix from an equation 10 below in place of the equation 6 and using a DOA evaluation function given by an equation 11 instead of the one given by the equation 8. In this case, it is possible to execute DOA estimation more accurate than the one that uses the correlation vectors under a propagation environment where the spread angle of incoming path components is large, with a little price of an increased amount of computation.

$$r^P = \frac{1}{N_s} \sum_{k=1}^{N_s} x^P(k) x^P(k)^H \quad (10)$$

$$F(\theta) = a^H(\theta) r a(\theta) \quad (11)$$

Although the operation of the first embodiment has been given referring to the DOA estimation algorithm that belongs to the beamforming scheme, an eigenvalue decomposition, such as MUSIC (Multiple Signal Classification) or ESPRIT (Estimation of Signal Parameters via Rotational Invariance Technique), may be used instead. While this case increases the amount of computation, the resolution of proximity arriving path components and the estimation precision of the path components are improved.

The foregoing description of the embodiment has been given on the assumption that a plurality of antennae are laid out linearly at the intervals of half wavelengths of a carrier. The invention is not however limited to this particular case but is adaptable to any base station apparatus which has a plurality of antennae and forms the directivity.

(Second Embodiment)

Figure 3:
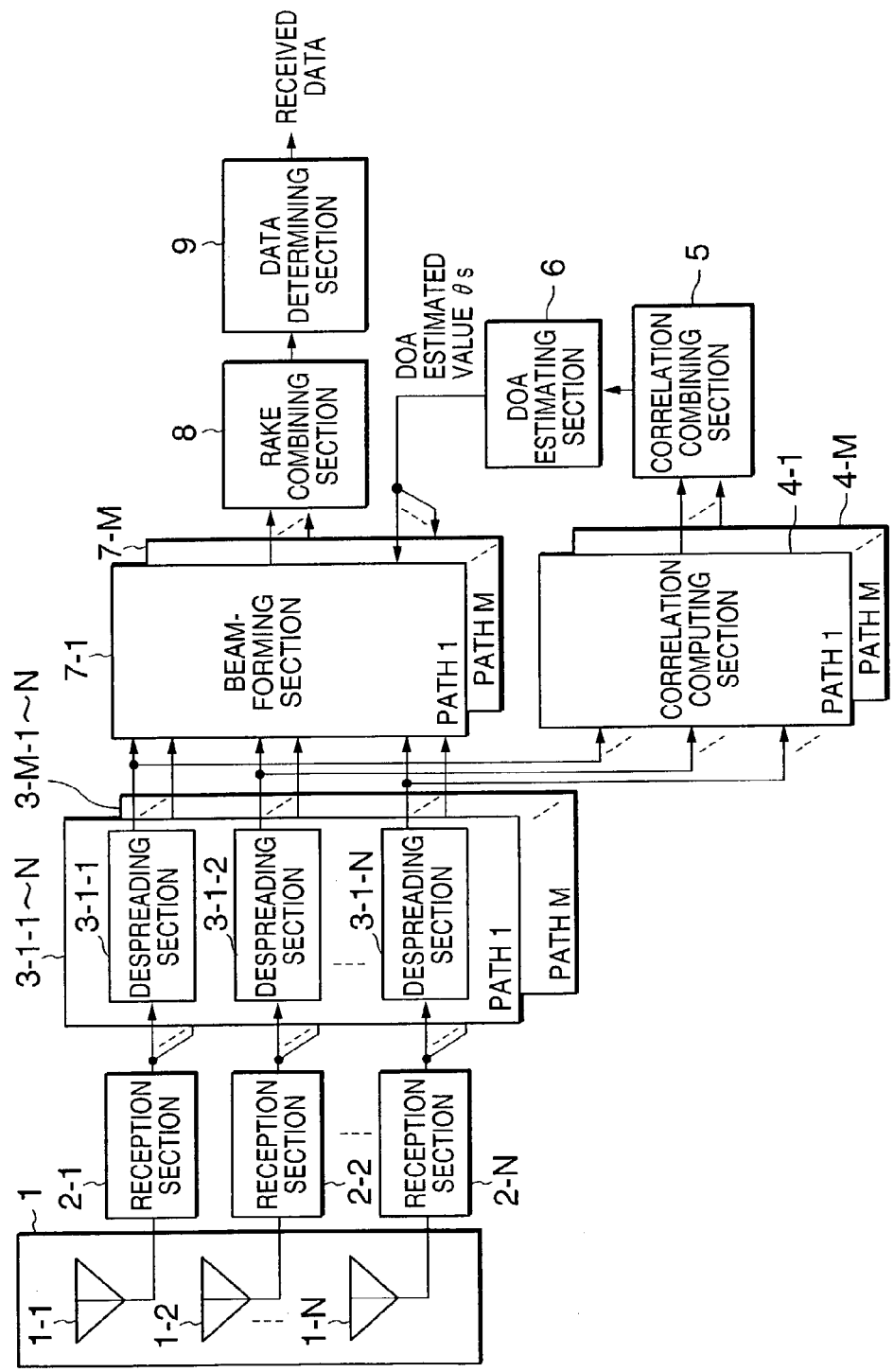
FIG. 3 is a block diagram showing the structure of an adaptive antenna base stat of apparatus according to a second embodiment of the invention.

FIG. 3 is a block diagram showing the structure of an adaptive antenna base station apparatus that forms a reception directive beam based on the result of estimation done in a DOA estimating section 6 according to the second embodiment of the invention. The apparatus comprises an array antenna 1, reception sections 2-1 to 2-N, despreading sections 3-1-1 to 3-1-N, . . . , and 3-M-1 to 3-M-N, correlation computing sections 4-1 to 4-M, a correlation combining section 5, a DOA estimating section 6, beamforming sections 7-1 to 7-M, a Rake combining section 8 and a data determining section 9. The following will mainly discuss what differs from the first embodiment.

The operation up to the acquisition of a DOA estimated value by the DOA estimating section 6 based on the signals received by the array antenna 1 is similar to that of the first embodiment. In the second embodiment, however, the DOA estimating section 6 detects only the direction that shows the highest peak in the angular spectrum and outputs its estimated value θs.

Each of the beamforming sections 7-1 to 7-M generates a beam weight vector $W_1$, which directs the main beam of the array antenna 1 toward the estimated direction of θs and outputs an array-combined signal $y^P(k)$ which is the result of multiplying the p-th path signal vector or the output of the associated one of the despreading sections 3-1-1 to 3-1-N, . . . , and 3-M-1 to 3-M-N by the beam weight vector $W_1$ as expressed by an equation 12. It is to be noted that p is in a range of 1 to M. A specific example of the beam weight vector $W_1$ in use is a steering vector a(θs) a Chebyshev beam weight or the like.

$$y^P(k) = W_1^H X^P(k) \quad (12)$$

The Rake combining section 8 multiplies array-combined signals $y^1(k)$ to $y^M(k)$ by complex conjugate values $(S_1)^*$ to $(S_M)^*$ of channel estimated values $S_1$ to $S_M$, and performs Rake combining after compensation for channel variations $h_1$ to $h_M$. The sign of the Rake-combined signal is judged by the data determining section 9, yielding received data.

According to the embodiment, as apparent from the above, based on the result of the estimation in the DOA estimating section 6, the beamforming sections 7-1 to 7-M can receive electric waves by directing the directivity of the array antenna 1 common to M paths coming from near-by directions to the direction that maximizes the combined power of the M paths.

In case where the array antenna of the base station is sited at a place sufficiently higher than near-by buildings, the angular spread of incoming waves is generally deemed to be about 10°. In such an environment, the adaptation of the embodiment is very effective.

The embodiment can estimate the direction that maximizes the combined power of M paths through a single angle sweep computation in the DOA estimating section 6, which is common to the M paths, without estimating the DOA for each path. This makes it possible to reduce the amount of computation and the scale of the arithmetic operation circuits.

Although the embodiment has been described of the base station apparatus that is used in a communication system which uses a CDMA (Code Division Multiple Access) system as a multiplexing system, the invention is not limited to this case. The invention can be adapted to base station apparatuses that are used in communication systems which use multiplexing systems, such as a TDMA (Time Division Multiple Access) system and an OFDM (Orthogonal Frequency Division Multiplexing) system, and which uses a system combining those multiplexing systems.

The foregoing description of the embodiment has been given of the assumed case where N antennae are laid out linearly at the intervals of half wavelengths of a carrier. The invention is not however limited to this particular case but is adaptable to any base station apparatus which has N antennae and forms the directivity.

The second embodiment combines signals coming through the individual paths using the Rake combining technique. The invention is not however limited to this case but is adaptable to any combining scheme which can combine signals coming through the individual paths antenna by antenna.

(Third Embodiment)

Figure 4:
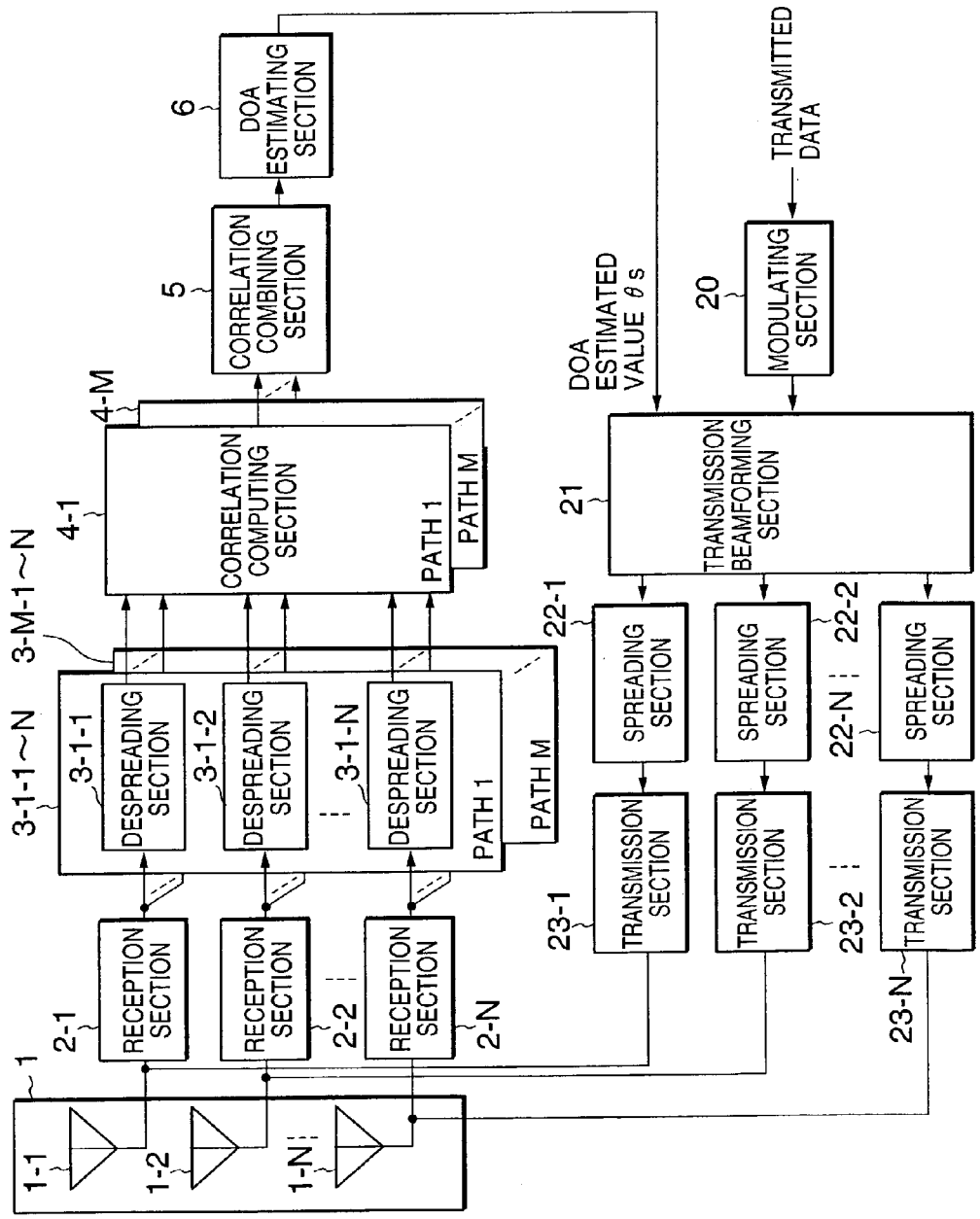
FIG. 4 is a block diagram illustrating the structure of an adaptive antenna base station apparatus according to a third embodiment of the invention.

FIG. 4 is a block diagram showing the structure of an adaptive antenna base station apparatus that adaptively forms a transmission directivity based on the result of estimation done in the DOA estimating section 6 of the first embodiment. The apparatus comprises an array antenna 1, reception sections 2-1 to 2-N, despreading sections 3-1-1 to 3-1-N, . . . , and 3-M-1 to 3-M-N, correlation computing sections 4-1 to 4-M, a correlation combining section 5, a DOA estimating section 6, beamforming sections 7-1 to 7-M, a modulating section 20, a transmission beamforming section 21, spreading sections 22-1 to 22-N and transmission sections 23-1 to 23-N. The following will mainly discuss what differs from the first embodiment.

The operation up to the acquisition of a DOA estimated value by the DOA estimating section 6 based on the signals received by the array antenna 1 is similar to that of the first embodiment.

The modulating section 20 modulates transmission data to the adequate modulation format. The modulation format includes all amplitude modulation systems, frequency modulation systems and phase modulation systems of analog modulation and digital modulation.

The transmission beamforming section 21 distributes the output of the modulating section 20 to a number equal to N or the number of the antenna elements of the array antenna 1 and multiplies the suboutputs by the elements in a transmission weight vector $W_s = [w_1, w_2, \ldots, w_n]$ before sending them out.

The DOA estimating section 6 detects only the direction toward a peak which has Nd=1 and maximizes the angular spectrum, and uses the steering vector a(θ) as expressed by an equation 13 or a Chebyshev beam weight or the like that directs the main beam in the direction of θs, as the transmission weight vector $W_s$, at the time of outputting the estimated value θs.

$$W_s = a^H(\theta_s) \quad (13)$$

The DOA estimating section 6 detects the directions toward peaks of the angular spectrum with Nd greater than 1 in order from a higher level to a lower one, and uses the sum of steering vectors a(θs) as given by an equation 14 or a combined weight or the like of plural Chebyshev beam weights that direct the main beam in the estimated direction, as the transmission weight vector $W_s$, at the time of outputting the estimated value θs. It should be noted however that k=1 to Nd.

$$W_S = \frac{1}{\sqrt{Nd}} \sum_{k=1}^{Nd} a^H(\theta_k) \quad (14)$$

The spreading sections 22-1 to 22-N spread the output signal of the transmission beamforming section 21 with a spreading code with a predetermined spreading ratio and send the resultant signal to the transmission sections 23-1 to 23-N. After subjecting the outputs of the spreading sections 22-1 to 22-N to predetermined radio processing (D/A conversion, frequency upconversion or the like), the transmission sections 23-1 to 23-N transmit the result signals to a communication terminal via the antenna elements 1-1 to 1-N.

As described above, in addition to the effect of the first embodiment, the third embodiment has such an effect that when Nd=1, the transmission beamforming section 21 can transmit waves by directing the directivity of the array antenna 1 common to M paths with respect to the direction that maximizes the combined power of the M paths coming from near-by directions. In case where the array antenna of the base station is sited at a place sufficiently higher than near-by buildings, the angular spread of incoming waves is generally considered to be about 10°. Under such an environment, the adaptation of the embodiment is extremely effective and the reception characteristic of a communication terminal is improved without radiating electric waves in unnecessary directions.

The embodiment can estimate the direction that maximizes the combined power of M paths through a single angle sweep computation in the DOA estimating section 6 without estimating the DOA for each path. This can ensure reductions in the amount of computation and the scale of the arithmetic operation circuits.

When Nd is greater than 1, the transmission beamforming section 21 can form a beam directed toward the estimated direction with M being an upper limit. In this case, when the array antenna of the base station is sited at a place sufficiently higher than near-by buildings, the angular spread of incoming waves generally becomes larger, which brings about an environment where M path components each having a wide angle arrive. Under such an environment, the embodiment can form a directive beam with respect to wide paths of different directions. This can allow a communication terminal to receive electric waves from the respective directions and efficiently receive combined M path components through the Rake combining process or the like. This results in an improved reception characteristic.

According to the embodiment, it is possible to estimate M path directions at a time through a single DOA estimating process. As DOAs of M paths can be estimated from a single angular spectrum, it is possible to reduce the amount of computation the scale of the apparatus.

Although the embodiment has been described of the base station apparatus that is used in a communication system which uses a CDMA system as a multiplexing system, the invention is not limited to this case. The invention can be adapted to base station apparatuses that are used in communication systems which use multiplexing systems, such as a TDMA system and an OFDM system, and which uses a system combining those multiplexing systems.

The foregoing description of the embodiment has been given of the assumed case where N antennae are laid out linearly at the intervals of half wavelengths of a carrier. The invention is not however limited to this particular case but is adaptable to any base station apparatus which has N antennae and forms the directivity.

The third embodiment combines signals coming through the individual paths using the Rake combining technique. The invention is not however limited to this case but is adaptable to any combining scheme which can combine signals coming through the individual paths antenna by antenna.

(Fourth Embodiment)

Figure 5:
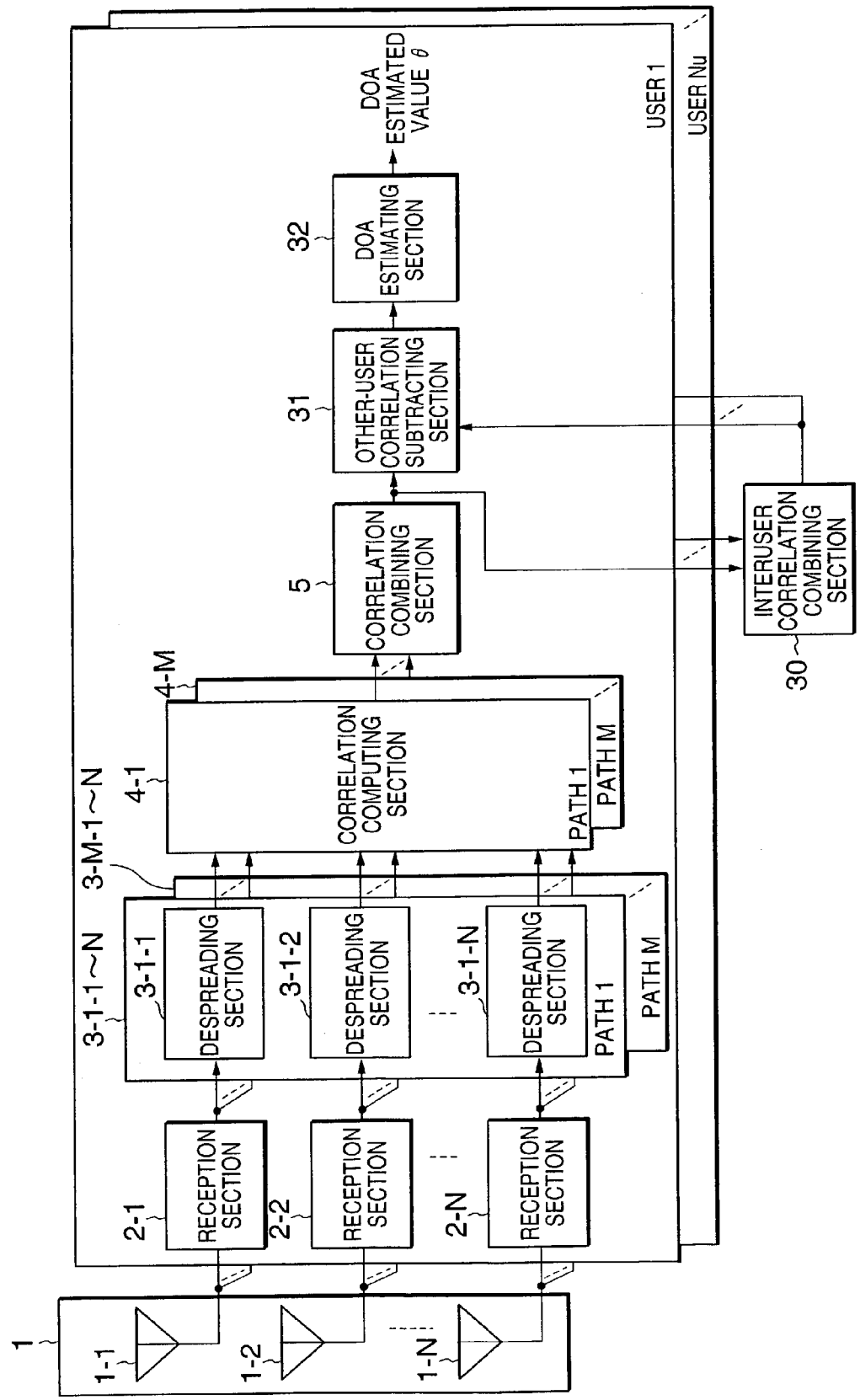
FIG. 5 is a block diagram illustrating the structure of an adaptive antenna base station apparatus according to a fourth embodiment of the invention.

FIG. 5 is a block diagram showing the structure of an adaptive antenna base station apparatus according to the fourth embodiment of the invention. The apparatus comprises an array antenna 1, reception sections 2-1 to 2-N, despreading sections 3-1-1 to 3-1-N, . . . , and 3-M-1 to 3-M-N, correlation computing sections 4-1 to 4-M, a correlation combining section 5, an interuser correlation combining section 30, an other-user correlation subtracting section 31 and a DOA estimating section 32. This base station apparatus differs from the one shown in FIG. 1 in the provision of the last two components: the interuser correlation combining section 30 which combines the outputs of the correlation combining sections 5 acquired on the individual user sides and the other-user correlation subtracting section 31 subtracts other-user correlation components based on the output of the interuser correlation combining section 30. The following will mainly discuss the operation that differs from the operation of the first embodiment of the invention. In the following description, $N_u$, which is included in a received wave, is the total number of users who are communicating simultaneously.

The operation up to the acquisition of a correlation vector $r^{(u)}$ of a u-th user, shown by the equation 7, by the correlation combining section 5 based on the signals received by the array antenna 1 is similar to that of the first embodiment. It is to be noted however that u=1 to $N_u$.

The interuser correlation combining section 30 combines correlation vectors $r^{(u)}$, obtained from received signals from users different from the u-th user, as expressed by an equation 15. While the equation 15 further combines the outputs of the correlation combining sections 5 of all the users, only those pieces of data with fast data rate which become a considerable interference to other users may be selected in accordance with the SIR estimated value of individual users, and then the outputs of the correlation combining sections 5 may be combined. For example, only that data which has a faster rate than the voice rate is selected.

$$V = \sum_{u=1}^{N_u} r^{(u)} \quad (15)$$

The other-user correlation subtracting section 31 acquires other-user correlation vectors $U^{(u_O)}$, consisting of combined components of correlation vectors of other users, by subtracting a correlation vector $r^{(u_O)}$ of a $u_O$-th user of interest from the output, V, of the interuser correlation combining section 30, as expressed by an equation 16, and then computes an interference-eliminated correlation vector $R^{(uO)}$ from which other-user correlation vector components have been eliminated, as expressed by an equation 17. In the equation 17, $r_1^{(uO)}$ is the first element in the correlation vector $r^{(uO)}$, $U_1^{(uO)}$ is the first element in the other-user correlation vector $U^{(uO)}$, and α is a positive constant smaller than 1 and is specifically set to about 0.5. Alternatively, the structure may be modified in such a way that α is variable according to the SIR estimated value of the $u_O$-th user and variable control to make α smaller when the SIR is sufficiently high may be added.

$$U^{(uO)} = V - r^{(uO)} \quad (16)$$

$$R^{(uO)} = r^{(uO)} - \alpha \frac{r_1^{(uO)}}{U_1^{(uO)}} U^{(uO)} \quad (17)$$

The DOA estimating section 32 acquires a DOA estimated value as in the first embodiment by using the interference-eliminated correlation vector $R^{(uO)}$ or the output of the other-user correlation subtracting section 31 in place of the correlation vector $r^{(uO)}$. That is, the angular spectrum is computed by changing θ of a DOA evaluation function F(θ), given by an equation 18, and then the directions of Nd peaks in the descending order of the reception power level as DOA estimated values. It is to be noted however that a(θ) is the steering vector which is determined by the layout of the array antenna elements.

$$F(\theta) = |(R^{(uO)})^H a(\theta)| \quad (18)$$

In addition to the effects of the first embodiment, as apparent from the above, the fourth embodiment has a capability of eliminating correlation vector components originating from waves coming from other users by estimating the DOA using the interference-eliminated correlation vector $R^{(uO)}$ or the output of the other-user correlation subtracting section 31, and a capability of accurately detecting the DOA of electric waves from the $u_O$-th user even in case where the transmission powers from other users are large. Even in case where path components of other users come from different directions, the correlation combining section 5, which computes correlation vectors obtained by combining the arriving wave components from the paths, can eliminate those path components at a time. This contributes to simplifying the apparatus structure and reducing the amount of computation involved.

Although the estimation of the DOA is carried out using the correlation vectors in the embodiment, the DOA can be estimated using a correlation matrix by computing the correlation matrix from the equation 10 in place of the equation 6 and using a DOA evaluation function given by an equation 19 instead of the one given by the equation 18. In this case, it is possible to execute DOA estimation more accurate than the one that uses the correlation vectors under a propagation environment where the spread angle of incoming path components is large, with a little price of an increased amount of computation.

$$F(\theta) = a^H(\theta) R^{(uO)} a(\theta) \quad (19)$$

Although the operation of the first embodiment has been given referring to the DOA estimation algorithm that belongs to the beamforming scheme, an eigenvalue decomposition, such as MUSIC or ESPRIT, may be used instead. While this case increases the amount of computation, the resolution of proximity arriving path components and the estimation precision of the path components are improved.

Although the embodiment has been described of the base station apparatus that is used in a communication system which uses a CDMA system as a multiplexing system, the invention is not limited to this case. The invention can be adapted to base station apparatuses that are used in communication systems which use multiplexing systems, such as a TDMA system and an OFDM system, and which uses a system combining those multiplexing systems.

The foregoing description of the embodiment has been given of the assumed case where N antennae are laid out linearly at the intervals of half wavelengths of a carrier. The invention is not however limited to this particular case but is adaptable to any base station apparatus which has N antennae and forms the directivity.

(Fifth Embodiment)

Figure 6:
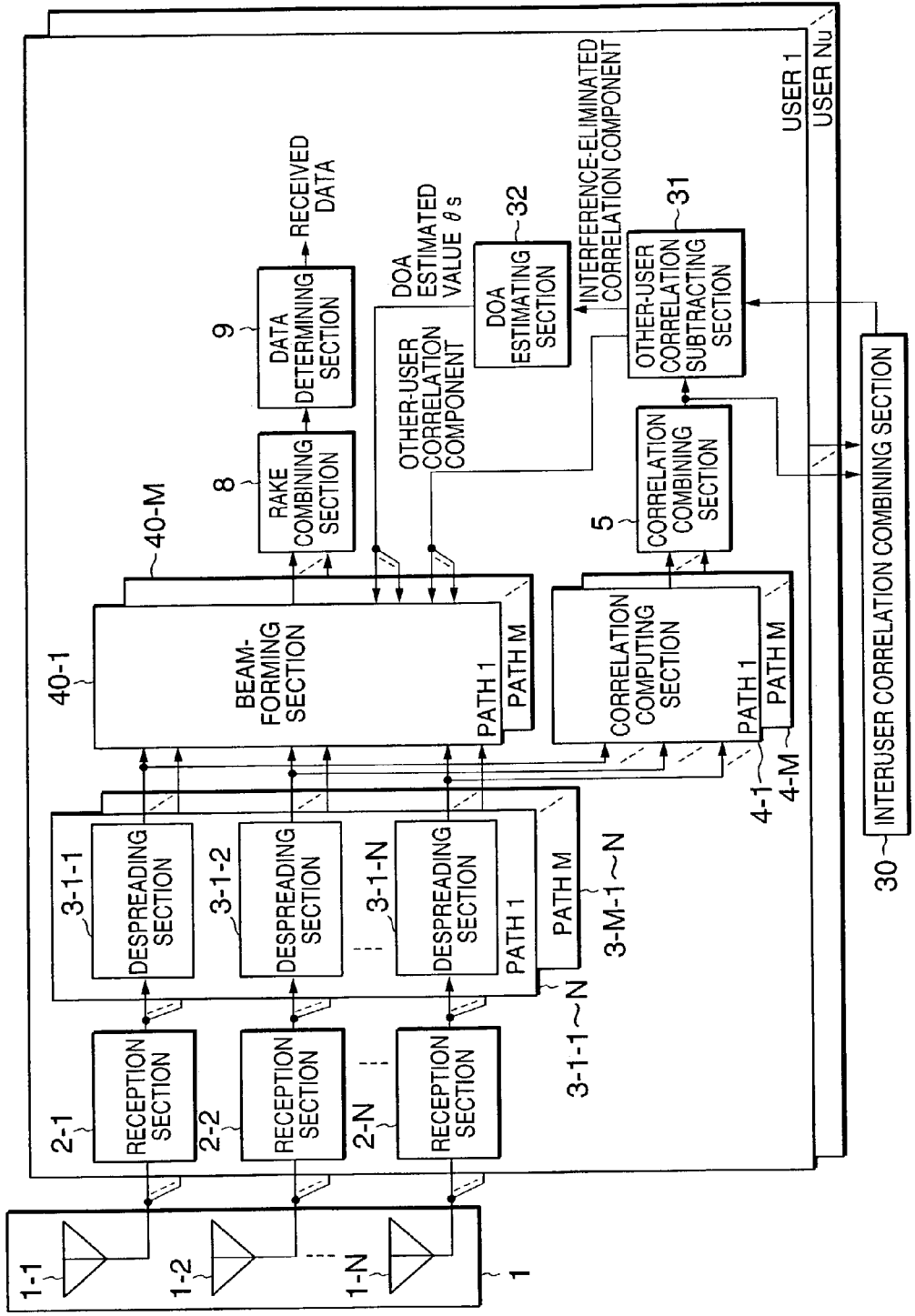
FIG. 6 is a block diagram showing the structure of an adaptive antenna base station apparatus according to a fifth embodiment of the invention.

FIG. 6 is a block diagram showing the structure of an adaptive antenna base station apparatus that forms a reception directive beam based on the result of estimation done in the DOA estimating section 32 of the fourth embodiment. The apparatus comprises an array antenna 1, reception sections 2-1 to 2-N, despreading sections 3-1-1 to 3-1-N, . . . , and 3-M-1 to 3-M-N, correlation computing sections 4-1 to 4-M, a correlation combining section 5, an interuser correlation combining section 30, an other-user correlation subtracting section 31, a DOA estimating section 32, beamforming sections 40-1 to 40-M, a Rake combining section 8 and a data determining section 9. The following will mainly discuss what differs from the fourth embodiment. In the following description, $N_u$, is the total number of users who are communicating simultaneously.

The operation up to the acquisition of a DOA estimated value by the DOA estimating section 32 based on the signals received by the array antenna I is similar to that of the first embodiment. In the second embodiment, however, the DOA estimating section 32 detects only the direction that shows the highest peak in the angular spectrum and outputs its estimated value θs.

Each of the beamforming sections 40-1 to 40-M generates a beam weight vector $W^{(uO)}$ of the array antenna 1, given by an equation 20, based on the DOA estimated value θs and other-user correlation vectors $U^{(uO)}$ in the equation 16, which are obtained in the process performed by the other-user correlation subtracting section 31, and outputs an array-combined signal $y^P(k)$ which is the result of multiplying the p-th path signal vector or the output of the associated one of the despreading sections 3-p-1 to 3-p-N, as expressed by an equation 21, by the beam weight vector $W^{(uO)}$. In the equation 20, I is an N-th order unit matrix, TP(x) is a function to generate an N×N Hermitian symmetric Toeplitz matrix from an N-th order vector x and $U_1^{(uO)}$ is the first element in the other-user correlation vector $U^{(uO)}$. Further, β is a positive constant smaller than 1 and is a parameter which forms a null in the direction of arrival considering that the closer to 1, the greater the arriving powers of other users are. Specifically, β in use is equal to about 0.2.

$$W^{(uO)} = \left[ I - \beta TP\left( \frac{U^{(uO)}}{U_1^{(uO)}} \right) \right] a(\theta_S) \quad (20)$$

$$y^P(k) = (W^{(uO)})^H x^P(k) \quad (21)$$

The Rake combining section 8 multiplies array-combined signals $y^1(k)$ to $y^M(k)$ by complex conjugate values $(S_1)^*$ to $(S_M)^*$ of channel estimated values $S_1$ to $S_M$, and performs Rake combining after compensation for channel variations $h_1$ to $h_M$. The sign of the Rake-combined signal is judged by the data determining section 9, yielding received data.

According to the embodiment, as apparent from the above, based on the result of the estimation in the DOA estimating section 32, the beamforming sections 40 can receive electric waves by directing the directivity of the array antenna 1 common to M paths coming from near-by directions to the direction that maximizes the combined power of the M paths. Further, the null of a directive beam from the array antenna 1 can be directed in the direction of other communication terminals which are to be accessed simultaneously with different spread codes, thus making it possible to improve the SIR and improve the reception characteristic of the base station considerably.

As the embodiment estimates the DOA and forms a beam using correlation vectors, it is possible to reduce the amount of computation and the cost for the arithmetic operation circuits as compared with the case where the correlation matrix is used.

In place of the correlation computing sections 4-1 to 4-M provided for the respective paths and the correlation combining section 5, which are used in this embodiment, the structure which selects the maximum power path from M paths and computes the correlation vector of that path may be used.

In the embodiment, the directivity is formed using a common beamweight with respect to all the paths. In case where it is possible to estimate the DOA for each path, however, the same effect can be acquired by the structure that uses the beamweight of the array antenna 1 obtained in a similar method for each path.

Although the estimation of the DOA and the generation of a beamweight are carried out using the correlation vectors in the embodiment, the DOA can be estimated using a correlation matrix by computing the correlation matrix from the equation 10 in place of the equation 6 and using a DOA evaluation function given by the equation 19 instead of the one given by the equation 18. In this case, the beamforming sections 40 can generate beamweights using an equation 22 or an equation 23.

$$W^{(uO)} = \left[I - \beta \frac{1}{U_1^{(uO)}} U^{(uO)}\right] a(\theta_S) \quad (22)$$

$$W^{(uO)} = (U^{(uO)})^{-1} a(\theta_s) \quad (22)$$

Although the embodiment has been described of the base station apparatus that is used in a communication system which uses a CDMA system as a multiplexing system, the invention is not limited to this case. The invention can be adapted to base station apparatuses that are used in communication systems which use multiplexing systems, such as a TDMA system and an OFDM system, and which uses a system combining those multiplexing systems.

The foregoing description of the embodiment has been given on the assumption that N antennae are laid out linearly at the intervals of half wavelengths of a carrier. The invention is not however limited to this particular case but is adaptable to any base station apparatus which has N antennae and forms the directivity.

The fifth embodiment combines signals coming through the individual paths using the Rake combining technique. The invention is not however limited to this case but is adaptable to any combining scheme which can combine signals coming through the individual paths antenna by antenna.

(Sixth Embodiment)

Figure 7:
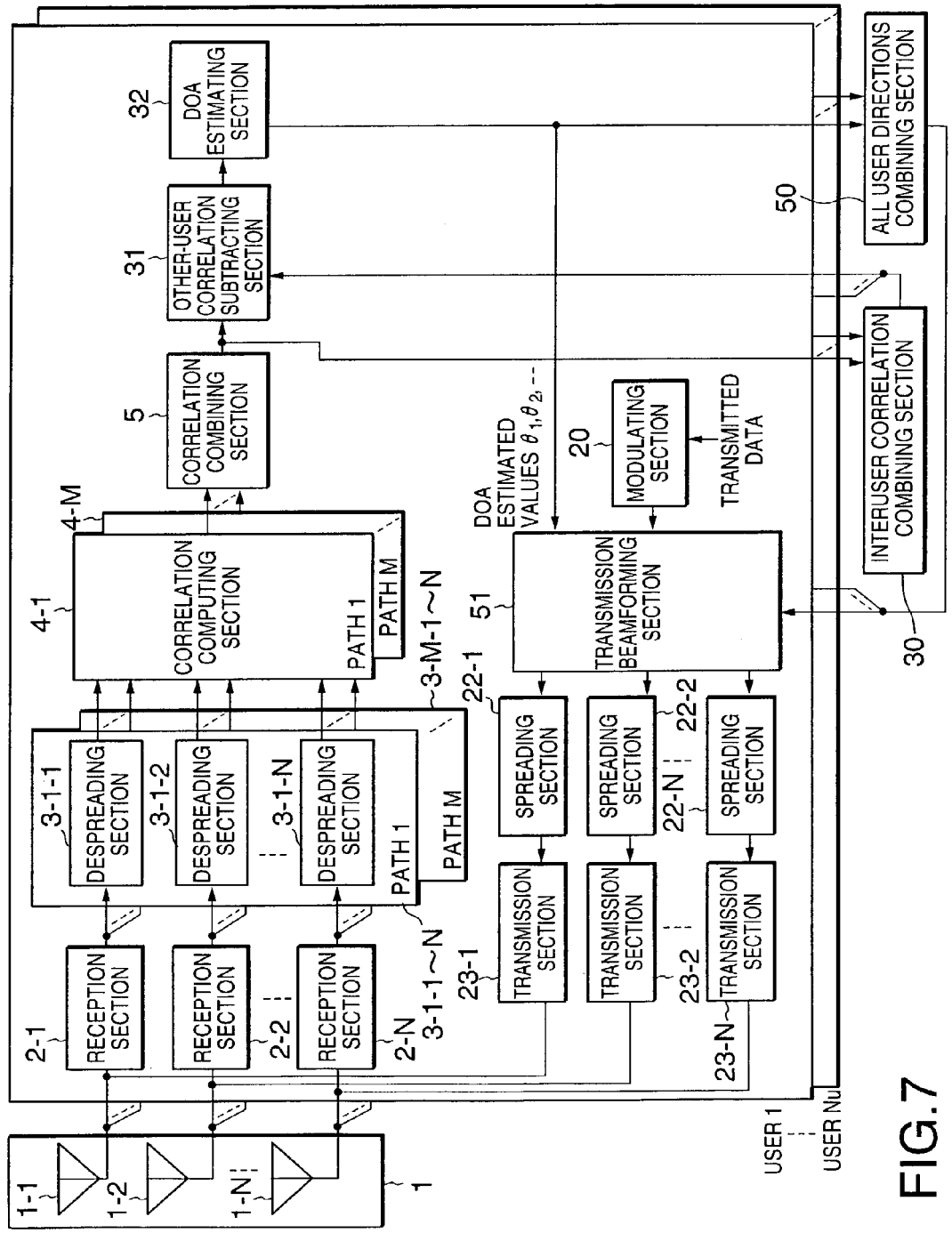
FIG. 7 is a block diagram showing the structure of an adaptive antenna base station apparatus according to a sixth embodiment of the invention.

FIG. 7 is a block diagram showing the structure that adaptively forms the reception directivity based on the result of estimation done in the DOA estimating section 32 of the fourth embodiment. The apparatus comprises an array antenna 1, reception sections 2-1 to 2-N, despreading sections 3-1-1 to 3-1-N, . . . , and 3-M-1 to 3-M-N, correlation computing sections 4-1 to 4-M, a correlation combining section 5, an other-user correlation subtracting section 31, a DOA estimating section 32, a modulating section 20, a transmission beamforming section 51, spreading sections 22-1 to 22-N, transmission sections 23-1 to 23-N, an inter-user correlation combining section 30 and an all user directions combining section 50. In the following description, $N_u$ is the total number of users who are communicating simultaneously.

The operation up to the acquisition of a DOA estimated value by the DOA estimating section 32 based on received signals from a $u_o$-th user is similar to that of the fourth embodiment. In the sixth embodiment, however, the estimated number of directions of arrival output from the DOA estimating section 32 is Nd which is equal to or greater than 1.

The all user directions combining section 50 combines the steering vectors $a(\theta_k^{(u)})$ of the array antenna 1 at a DOA estimated value $\theta_k^{(u)}$ from the DOA estimating section 32 with respect to the u-th user, which is acquired based on the received signals from each user, as expressed by an equation 24. It should be noted that k=1 to Nd and u=1 to $N_u$.

$$Z = \sum_{u=1}^{Nu} \sum_{k=1}^{Nd} a(\theta_k^{(u)}) \quad (24)$$

The modulating section 20 modulates transmission data to the adequate modulation format. The modulation format includes all amplitude modulation systems, frequency modulation systems and phase modulation systems of analog modulation and digital modulation.

The transmission beamforming section 51 first computes the other-user correlation vector $U^{(uO)}$ obtained by combining the steering vectors of other users in the estimated directions by using the DOA estimated value $\theta_k^{(uO)}$ of the $u_o$-th user and the output, Z, of the all user directions combining section 50. Then, the transmission beamforming section 51 directs the main beam in the estimated direction of the $u_o$-th user, generates the transmission beamweight $W^{(uO)}$ which forms a null in the directions of other users, distributes the output of the modulating section 20 to a number equal to N or the number of the antenna elements of the array antenna 1 and multiplies the suboutputs by the elements in a transmission weight vector $W^{(uO)} = [w_1, w_2, \ldots, w_n]$ before sending them out. In the equation 26, I is an N-th order unit matrix, TP(x) is a function to generate an N×N Hermitian symmetric Toeplitz matrix from an N-th order vector x and $U_1^{(uO)}$ is the first element in the other-user correlation vector $U^{(uO)}$. Further, γ is a positive constant smaller than 1 and is a parameter which forms a null in the direction of arrival considering that the closer to 1, the greater the arriving powers of other users are. Specifically, γ1 in use is equal to about 0.2. Although γ is treated as a constant which does not depend on the user, it may be changed in accordance with the transmission power ratio among the individual users.

$$U^{(uO)} = Z - \sum_{k=1}^{N_d} a(\theta_k^{(uO)}) \quad (25)$$

$$W^{(uO)} = \left[I - \gamma TP\left(\frac{U^{(uO)}}{U_1^{(uO)}}\right)\right] \sum_{k=1}^{N_d} \frac{a(\theta_k^{(u)})}{\sqrt{N_d}} \quad (26)$$

The spreading sections 22-1 to 22-N spread the output signal of the transmission beamforming section 51 with a spreading code with a preset spreading ratio and send the resultant signal to the transmission sections 23-1 to 23-N. After subjecting the outputs of the spreading sections 22-1 to 22-N to radio processing (D/A conversion, frequency upconversion or the like), the transmission sections 23-1 to 23-N transmit the result signals to a communication terminal via the antenna elements 1-1 to 1-N.

According to the sixth embodiment of the invention, as described above, when Nd of the DOA estimating section 32 is 1, the transmission beamforming section 51 can transmit waves by directing the directivity of the array antenna 1 common to M paths with respect to the direction that maximizes the combined power of the M paths coming from near-by directions, and can form a null with the directivity of the array antenna 1 with respect to other users who are communicating simultaneously, thus ensuring an improvement on the SIR. In case where the array antenna of the base station is sited at a place sufficiently higher than near-by buildings, the angular spread of incoming waves is generally considered to be about 10°. Under such an environment, the adaptation of the embodiment is extremely effective and it is possible to reduce the interference among other users and increase the subscriber capacity, without radiating electric waves in unnecessary directions, by narrowing the transmission beam in the direction of a communication terminal.

The embodiment can estimate the direction that maximizes the combined power of M paths through a single angle sweep computation in the DOA estimating section 32, which is common to the M paths, without estimating the DOA for each path. This makes it possible to reduce the amount of processing and the scale of the arithmetic operation circuits.

When Nd of the DOA estimating section 32 is greater than 1, the transmission beamforming section 51 can form a beam directed toward the M estimated direction. In case where the array antenna of the base station is sited at a place sufficiently higher than near-by buildings, the angular spread of incoming waves generally becomes larger, which increases the environment where M path components each having a wide angle arrive. Under such an environment, it is possible to form a directive beam with respect to wide paths of different directions. This can allow a communication terminal to receive electric waves from the respective directions and efficiently receive combined M path components through the Rake combining process or the like. This results in an improved reception characteristic.

As the embodiment estimates the DCA and forms a transmission beam using correlation vectors, it is possible to reduce the amount of computation and the cost for the arithmetic operation circuits as compared with the case where the correlation matrix is used. The known equation to obtain a Wiener solution requires an inverse matrix computation, whereas the embodiment does not require the inverse matrix computation and thus has an effect of reducing the amount of computation.

In place of the correlation computing sections 4-1 to 4-M provided for the respective paths and the correlation combining section 5, which are used in this embodiment, the structure which selects the maximum power path from M paths and computes the correlation vector of that path may be used.

Although the embodiment has been described of the base station apparatus that is used in a communication system which uses a CDMA system as a multiplexing system, the invention is not limited to this case. The invention can be adapted to base station apparatuses that are used in communication systems which use multiplexing systems, such as a TDMA system and an OFDM system, and which uses a system combining those multiplexing systems.

The foregoing description of the embodiment has been given of the assumed case where M antennae are laid out linearly at the intervals of half wavelengths of a carrier. The invention is not however limited to this particular case but is adaptable to any base station apparatus which has M antennae and forms the directivity.

The embodiment combines signals coming through the individual paths using the Rake combining technique. The invention is not however limited to this case but is adaptable to any combining scheme which can combine signals coming through the individual paths antenna by antenna.

In short, as discussed above, the invention is directed to an adaptive antenna base station apparatus equipped with an array antenna, which can reduce the amount of computation at the time of estimating the DOAs with respect to M paths and can improve the speed of the computation or simplify the structure. The transmission section or reception section to which a directivity control function of directing the directivity in the direction estimated by the DOA estimating section of the invention can ensure an improvement on the SIR and high-quality communications.

The invention claimed is:

1. An adaptive antenna base station apparatus comprising:
an array antenna including N (N being a natural number) antenna elements;
N reception sections for respectively performing orthogonal detection of code-multiplexed high-frequency signals, respectively received by said antenna elements of said array antenna, after frequency conversion of said code-multiplexed high-frequency signals;
N×M despreading sections for performing despreading operations, corresponding to delay times of M (M being a natural number) path components included in output signals of said reception sections, with respect to said output signals of said reception sections;
M correlation computing sections for performing correlations among said antenna elements on output signals of said despreading sections for each path;
a correlation combining section for combining output signals of said correlation computing sections; and
a direction-of-arrival estimating section for estimating a direction of arrival by using an output of said correlation combining section.

2. The adaptive antenna base station apparatus according to claim 1, wherein said correlation computing sections compute correlation vectors corresponding to individual paths by performing a complex correlation operation on a signal vector, obtained from a single antenna element for each path, as a reference, and signal vectors obtained from the other antenna elements.

3. The adaptive antenna base station apparatus according to claim 1, wherein said correlation computing sections compute correlation matrices corresponding to individual paths by performing a complex correlation operation on all combinations of signal vectors obtained from said antenna elements path by path.

4. The adaptive antenna base station apparatus according to claim 1, wherein said direction-of-arrival estimating section computes an angular spectrum based on said output of said correlation combining section, detects a position of a highest peak of said angular spectrum and sets said detected position as an estimated value of said direction of arrival.

5. The adaptive antenna base station apparatus according to claim 1, wherein said direction-of-arrival estimating section computes an angular spectrum based on said output of said correlation combining section, detects positions of peaks of said angular spectrum and sets said detected positions as estimated values of said direction of arrival whose quantity has an upper limit of M.

6. The adaptive antenna base station apparatus according to claim 1, further comprising:
M beamforming sections for generating beamweights which determine a directivity of said array antenna by using an output of said direction-of-arrival estimating section, multiplying said beamweights by outputs of said despreading sections and combining multiplication results path by path;
a Rake combining section for combining outputs of said beamforming sections obtained path by path; and
a data determining section for outputting received data from an output of said Rake combining section in accordance with code determination.

7. The adaptive antenna base station apparatus according to claim 1, further comprising:
a transmission beamforming section for generating a transmission beamweight which determines a directivity of said array antenna by using an output of said direction-of-arrival estimating section and multiplying a transmission signal by said transmission beamweight;
N spreading sections for multiplying an output signal of said transmission beamforming section by spread codes corresponding to said antenna elements; and
N transmission sections for transmitting output signals of said spreading sections from said array antenna.

8. The adaptive antenna base station apparatus according to claim 2, wherein said direction-of-arrival estimating section computes an angular spectrum based on said output of said correlation combining section, detects a position of a highest peak of said angular spectrum and sets said detected position as an estimated value of said direction of arrival.

9. The adaptive antenna base station apparatus according to claim 3, wherein said direction-of-arrival estimating section computes an angular spectrum based on said output of said correlation combining section, detects a position of a highest peak of said angular spectrum and sets said detected position as an estimated value of said direction of arrival.

10. An adaptive antenna base station apparatus comprising:
an array antenna including N (N being a natural number) antenna elements;
$N_u \times N$ reception sections for respectively performing orthogonal detection of code-multiplexed high-frequency signals, respectively received by said antenna elements of said array antenna, after frequency conversion of said code-multiplexed high-frequency signals in association with $N_x$ ($N_u$ being a natural number) pieces of user-by-user information included in a received wave;
$N_u \times N \times M$ despreading sections for performing despreading operations, corresponding to delay times of M (M being a natural number) path components included in output signals of said reception sections, with respect to said output signals of said reception sections;
$N_u \times M$ correlation computing sections for performing correlations among said antenna elements on output signals of said despreading sections for each path;
$N_u$ correlation combining sections for combining output signals of said correlation computing sections;
an interuser correlation combining section for combining $N_u$ output signals of said correlation combining sections;
$U_u$ other-user correlation subtracting sections for computing correlation components of ($N_u-1$) other users by subtracting an output of that correlation combining section which is associated with a target user from an output of said interuser correlation combining section; and
$N_u$ direction-of-arrival estimating sections for estimating a direction of arrival of said target user by using outputs of said other-user correlation subtracting sections.

11. The adaptive antenna base station apparatus according to claim 10, further comprising:
$N_u \times M$ beamforming sections for generating beamweights that minimize reception power of other user components, which become interference waves for every $N_u$ users, from output signals of said $N_u$ direction-of-arrival estimating sections and output signals of said $N_u$ other-user correlation subtracting sections, multiplying said beamweights by output signals of M×N spreading sections and combining M paths for every $N_u$ users;
$N_u$ Rake combining sections for combining outputs of said beamforming sections; and
$N_u$ data determining sections for outputting received data from outputs of said Rake combining sections in accordance with code determination.

12. The adaptive antenna base station apparatus according to claim 10, further comprising:
an all user directions combining section for combining steering vectors of said array antenna from output signals of said $N_u$ direction-of-arrival estimating sections;
$N_u$ transmission beamforming sections for generating transmission beamweights which minimize transmission power to other users from an estimated value of said direction of arrival and an output signal of said all user directions combining section for every $N_u$ users and multiplying a transmission signal by said transmission beamweights;
$N_u \times N$ spreading sections for multiplying output signals of said transmission beamforming sections by spread codes corresponding to said $N_u$ users and N antenna elements; and
$N_u \times N$ transmission sections for transmitting output signals of said spreading sections from said array antenna.

13. The adaptive antenna base station apparatus according to claim 12, wherein said all user directions combining section combines said steering vectors in a direction of estimation of said array antenna by a weight coefficient which depends on said transmission power.

14. The adaptive antenna base station apparatus according to claim 10, wherein said interuser correlation combining section combines outputs of said correlation combining sections of a user which are signals of a fast data rate.

15. The adaptive antenna base station apparatus according to claim 11, wherein said interuser correlation combining section combines outputs of said correlation combining sections of a user which are signals of a fast data rate.

16. The adaptive antenna base station apparatus according to claim 12, wherein said interuser correlation combining section combines outputs of said correlation combining sections of a user which are signals of a fast data rate.

17. The adaptive antenna base station apparatus according to claim 13, wherein said interuser correlation combining section combines outputs of said correlation combining sections of a user which are signals of a fast data rate.

* * * * *